United States Patent
Eberle, Jr. et al.

(10) Patent No.: US 9,417,418 B2
(45) Date of Patent: Aug. 16, 2016

(54) FLEXIBLE LENSED OPTICAL INTERCONNECT DEVICE FOR SIGNAL DISTRIBUTION

(75) Inventors: James Joseph Eberle, Jr., Hummelstown, PA (US); Bruce Eltringham Barry, Middletown, PA (US)

(73) Assignee: CommScope Technologies LLC, Hickory, NC (US)

( * ) Notice: Subject to any disclaimer, the term of this patent is extended or adjusted under 35 U.S.C. 154(b) by 401 days.

(21) Appl. No.: 13/230,094

(22) Filed: Sep. 12, 2011

(65) Prior Publication Data

US 2013/0064506 A1  Mar. 14, 2013

(51) Int. Cl.
*G02B 6/44* (2006.01)
*G02B 6/36* (2006.01)
*G02B 6/32* (2006.01)

(52) U.S. Cl.
CPC ............ *G02B 6/4471* (2013.01); *G02B 6/3608* (2013.01); *G02B 6/32* (2013.01)

(58) Field of Classification Search
None
See application file for complete search history.

(56) References Cited

U.S. PATENT DOCUMENTS

| | | | |
|---|---|---|---|
| 4,697,874 A | 10/1987 | Nozick | |
| 4,733,936 A | 3/1988 | Mikolaicyk et al. | |
| 5,430,823 A | 7/1995 | Dupont et al. | |
| 5,438,641 A | 8/1995 | Malacarne | |
| 5,509,096 A | 4/1996 | Easley | |
| 5,530,783 A | 6/1996 | Belopolsky et al. | |
| 5,613,030 A | 3/1997 | Hoffer et al. | |
| 5,655,044 A | 8/1997 | Finzel et al. | |
| 5,889,910 A | 3/1999 | Igl et al. | |
| 5,971,626 A | 10/1999 | Knodell et al. | |
| 5,975,769 A | 11/1999 | Larson et al. | |
| 6,012,852 A | 1/2000 | Kadar-Kallen et al. | |
| 6,022,150 A | 2/2000 | Erdman et al. | |
| 6,027,252 A | 2/2000 | Erdman et al. | |
| 6,208,779 B1 | 3/2001 | Rowlette, Sr. et al. | |
| 6,215,938 B1 | 4/2001 | Reitmeier et al. | |
| 6,269,214 B1 | 7/2001 | Naudin et al. | |
| 6,480,661 B2 | 11/2002 | Kadar-Kallen et al. | |
| 6,496,638 B1 | 12/2002 | Andersen | |

(Continued)

FOREIGN PATENT DOCUMENTS

WO    WO 94/17534    8/1994

OTHER PUBLICATIONS

International Search Report and Written Opinion for PCT/US2012/054249 mailed Feb. 27, 2013.

(Continued)

*Primary Examiner* — Tina Wong
(74) *Attorney, Agent, or Firm* — Merchant & Gould P.C.

(57) ABSTRACT

A method and device for interconnecting optical components, such as optical fibers and optical circuits, in a flexible, repeatable, and cost-effective manner. Two or more optical components are interconnected by a flexible optical circuit substrate bearing one or more embedded optical fibers with a lens at each end of each fiber. The flexible optical circuit may be incorporated into a housing bearing apertures for receiving optical connectors of the optical components that are to be interconnected with the device. The lensed ends of the fibers embedded in the flexible optical circuit are positioned adjacent to the apertures for optically connecting to the fibers within the connectors installed in the apertures without conventional mating connectors disposed inside the housing.

8 Claims, 9 Drawing Sheets

(56) References Cited

U.S. PATENT DOCUMENTS

| | | | |
|---|---|---|---|
| 6,594,434 B1 | 7/2003 | Davidson et al. | |
| 6,600,866 B2 | 7/2003 | Gatica et al. | |
| 6,690,862 B1 | 2/2004 | Rietveld | |
| 6,763,166 B2 | 7/2004 | Yow, Jr. et al. | |
| 6,764,221 B1 | 7/2004 | de Jong et al. | |
| 6,768,860 B2 | 7/2004 | Liberty | |
| 6,775,458 B2 | 8/2004 | Yow, Jr. et al. | |
| 6,810,193 B1 | 10/2004 | Müller | |
| 6,845,208 B2 | 1/2005 | Thibault et al. | |
| 6,925,241 B2 | 8/2005 | Bohle et al. | |
| 6,934,457 B2 | 8/2005 | Vincent et al. | |
| H2144 H | 2/2006 | Baechtle et al. | |
| 7,006,748 B2 | 2/2006 | Dagley et al. | |
| 7,068,907 B2 | 6/2006 | Schray | |
| 7,092,592 B2 | 8/2006 | Verhagen et al. | |
| 7,130,498 B2 * | 10/2006 | Meis et al. | 385/14 |
| 7,302,153 B2 | 11/2007 | Thom | |
| 7,406,240 B2 | 7/2008 | Murano | |
| 7,433,915 B2 | 10/2008 | Edwards et al. | |
| 7,460,757 B2 | 12/2008 | Hoehne et al. | |
| 7,496,268 B2 | 2/2009 | Escoto et al. | |
| 7,689,089 B2 | 3/2010 | Wagner et al. | |
| 7,706,656 B2 | 4/2010 | Zimmel | |
| 7,722,261 B2 | 5/2010 | Kadar-Kallen et al. | |
| 7,738,755 B2 * | 6/2010 | Shioda | 385/130 |
| 7,738,760 B2 | 6/2010 | Fredrickson et al. | |
| 7,747,125 B1 | 6/2010 | Lee et al. | |
| 7,751,674 B2 | 7/2010 | Hill | |
| 7,775,725 B2 | 8/2010 | Grinderslev | |
| 7,856,166 B2 | 12/2010 | Biribuze et al. | |
| 7,889,961 B2 | 2/2011 | Cote et al. | |
| 8,059,932 B2 | 11/2011 | Hill et al. | |
| 8,078,017 B2 * | 12/2011 | Kodama et al. | 385/14 |
| 8,085,472 B2 | 12/2011 | Kadar-Kallen | |
| 2003/0128951 A1 | 7/2003 | Lecomte et al. | |
| 2003/0182015 A1 | 9/2003 | Domaille et al. | |
| 2004/0175090 A1 | 9/2004 | Vastmans et al. | |
| 2005/0018950 A1 * | 1/2005 | Arellano | 385/14 |
| 2005/0084200 A1 * | 4/2005 | Meis et al. | 385/14 |
| 2005/0123261 A1 | 6/2005 | Bellekens et al. | |
| 2006/0210222 A1 | 9/2006 | Watte et al. | |
| 2007/0003204 A1 | 1/2007 | Makrides-Saravanos et al. | |
| 2007/0230863 A1 | 10/2007 | Fukuda et al. | |
| 2008/0175550 A1 | 7/2008 | Coburn et al. | |
| 2009/0067802 A1 | 3/2009 | Hoehne et al. | |
| 2009/0097800 A1 | 4/2009 | Gurreri et al. | |
| 2010/0142910 A1 | 6/2010 | Hill et al. | |
| 2010/0158465 A1 | 6/2010 | Smrha | |
| 2010/0195955 A1 * | 8/2010 | Burnham et al. | 385/24 |
| 2011/0085771 A1 * | 4/2011 | Matsuyama et al. | 385/125 |
| 2011/0096404 A1 | 4/2011 | Kadar-Kallen | |
| 2011/0110673 A1 | 5/2011 | Elberbaum | |
| 2011/0217016 A1 | 9/2011 | Mullsteff | |
| 2011/0262077 A1 | 10/2011 | Anderson et al. | |
| 2011/0268404 A1 | 11/2011 | Cote et al. | |
| 2011/0268408 A1 | 11/2011 | Giraud et al. | |
| 2011/0268410 A1 | 11/2011 | Giraud et al. | |
| 2011/0268412 A1 | 11/2011 | Giraud et al. | |
| 2012/0008900 A1 | 1/2012 | Schneider | |
| 2012/0014645 A1 | 1/2012 | Kadar-Kallen | |
| 2012/0020618 A1 | 1/2012 | Erdman et al. | |
| 2012/0020619 A1 | 1/2012 | Kadar-Kallen et al. | |
| 2012/0051706 A1 | 3/2012 | Van Geffen et al. | |
| 2012/0057838 A1 | 3/2012 | Hill et al. | |
| 2012/0263415 A1 | 10/2012 | Tan et al. | |
| 2013/0077913 A1 | 3/2013 | Schneider et al. | |
| 2013/0089292 A1 * | 4/2013 | Ott | G02B 6/4471 385/78 |
| 2014/0133810 A1 * | 5/2014 | Schneider | G02B 6/3608 385/89 |

OTHER PUBLICATIONS

International Standard, "Fiber optic connector interfaces—Part 4-1: Type SC connector family—Simplified receptacle SC-PC connecter interfaces," Copyright IEC 61754-4-1, First edition, Jan. 2003 (9 pages).

U.S. Appl. No. 61/538,737, filed Sep. 23, 2011, and entitled "Flexible Optical Circuit" (13 pages).

Schneider et al., "Fibre Optic Circuits," TechCon 2011 (10 pages).

U.S. Appl. No. 13/326,852, filed Dec. 15, 2011, Inventor Kadar-Kallen, "Ferrule with Encapsulated Protruding Fibers".

* cited by examiner

FLEXIBLE LENSED OPTICAL INTERCONNECT DEVICE FOR SIGNAL DISTRIBUTION

FIELD OF THE INVENTION

The invention pertains to fiber optic connectivity for high speed signal distribution.

BACKGROUND OF THE INVENTION

Fiber optic breakout cassettes are passive, optical components that connect fibers between sets of cables. Such cassettes usually provided transition between multi-fibered connectors, such as MPO type connectors with MT ferrules, and single or dual fiber connectors, such as LC or SC type connectors. A typical fiber optic breakout cassette of the prior art is illustrated in FIG. 1. The function of this particular exemplary cassette 100 is to distribute the signals between the twelve fibers contained in fiber optic cable 103 and six dual-fiber cables 105. For instance, in a practical case, each dual-fiber cables 105 comprises one transmit channel and one receive channel. Hence, six of the fibers in the twelve-fiber cable 103 transmit data into and through the cassette to one of the fibers in each of the six dual-fiber cables 105. The other six the fibers in twelve-fiber cable 103 receive data through the cassette from the other one of the fibers in each of the six dual-fiber cables 105. Thus, multi-fiber cable 103 is terminated with a multi-fiber connector, such as an MPO plug connector 107. The six dual fiber cables 105 are each terminated with a dual fiber connector, such as dual fiber LC plug connectors 109. Alternately, each cable 105 could be terminated with two signal-fiber connectors. The cassette 100 comprises adapter 114 in an aperture in the wall of the housing 101 to which a twelve-fiber MPO-style receptacle connector 111 is attached on the inside of the housing for mating with the twelve-fiber MPO-style plug connector 107 at the end of cable 103. The cassette 100 further comprises six dual adapters 115 in apertures in the wall of the housing 101 to which twelve single-fiber LC-style receptacle connectors 113 are attached on the inside of the housing 101 for optically connecting to the six dual-fiber LC-style plug connectors 109 at the ends of fiber optic cables 105. Twelve individual fibers 117 are routed within the housing 101 between the back of the MPO receptacle connector 111 and the backs of the twelve LC receptacle connectors 113.

These optical cassettes 100 are rather expensive because they usually are assembled by hand by highly skilled workers and require connection of the fibers 117 to the connectors 111 and 113 at both ends of each fiber, which includes placing the fibers 117 into the ferrules of connectors 111, 113, epoxying the fibers in the connectors, polishing the end faces of the fibers, routing the fibers 117 within the tight space of the housing 101, and all the other steps normally associated with optical fiber terminations to connectors. Further, because the cassettes are hand-assembled, they are subject to human error and variability depending on operator skill and experience, especially with respect to improper fiber routing. In addition, assembly of a fiber optic cassette involves time-consuming, in-process testing, especially for higher speed components.

Even further, with the increasing prevalence of 40 GB and 100 GB per second optical networks, the breakout/consolidation in a fiber optic cassette involves multi-fiber connectors on both ends of the fibers since, in 40 GB and 100 GB networks, each channel now includes 4, 8, 10, or 20 fibers in parallel, rather than 2. With the channels now needing many more fibers, consolidation of these channels into larger fiber count trunks will be critical in the future as space inside data centers becomes more costly. As a consequence, the associated fiber routing inside the cassette becomes much more complex and prone to operator variability.

Power requirements for optical channels will be strict and space constraints will be significant. Hence, performance will need to be tightly controlled, such that tolerances will become increasingly strict and operator variability will become more and more problematic. This will lead to more costly, higher precision components, higher in-process testing costs, and increased levels of manufacturing rework and scrap.

SUMMARY OF THE INVENTION

The invention relates to a method and device for interconnecting optical components, such as optical fibers, optical connectors, and optical circuits, in a flexible, repeatable, and cost-effective manner. The invention can be implemented in optical cassettes, patch panels, patch panel enclosures, zone distribution hardware, wall fixtures, and the like. It may be used to replace breakout cables in data centers and the like. It may be applied in virtually any optical interconnectivity application. In accordance with the invention, two or more optical components are optically interconnected by a flexible optical circuit substrate bearing one or more embedded optical fibers with a lens at each end of each fiber. The lens may be embedded in the flexible optical circuit substrate or disposed in a separate supporting device either mounted on or apart from the substrate. The flexible optical circuit may be incorporated into a housing bearing apertures for receiving the optical connectors of the optical components that are to be interconnected with the device, such as the optical connectors at the ends of optical cables or at the interfaces of optical or electro-optical circuits. The cleaved ends of the fibers embedded in the flexible optical circuit or in a subsidiary device are positioned adjacent to lenses which allow optical coupling to the apertures for optically connecting to the fibers within the connectors installed in the apertures without the need for mating connectors inside of the housing. Alternately, fibers may be shaped such that they act as lenses to couple directly to a focusing device such as a lens to optically couple to the connectors mounted in the apertures.

DETAILED DESCRIPTION

Figure 1:
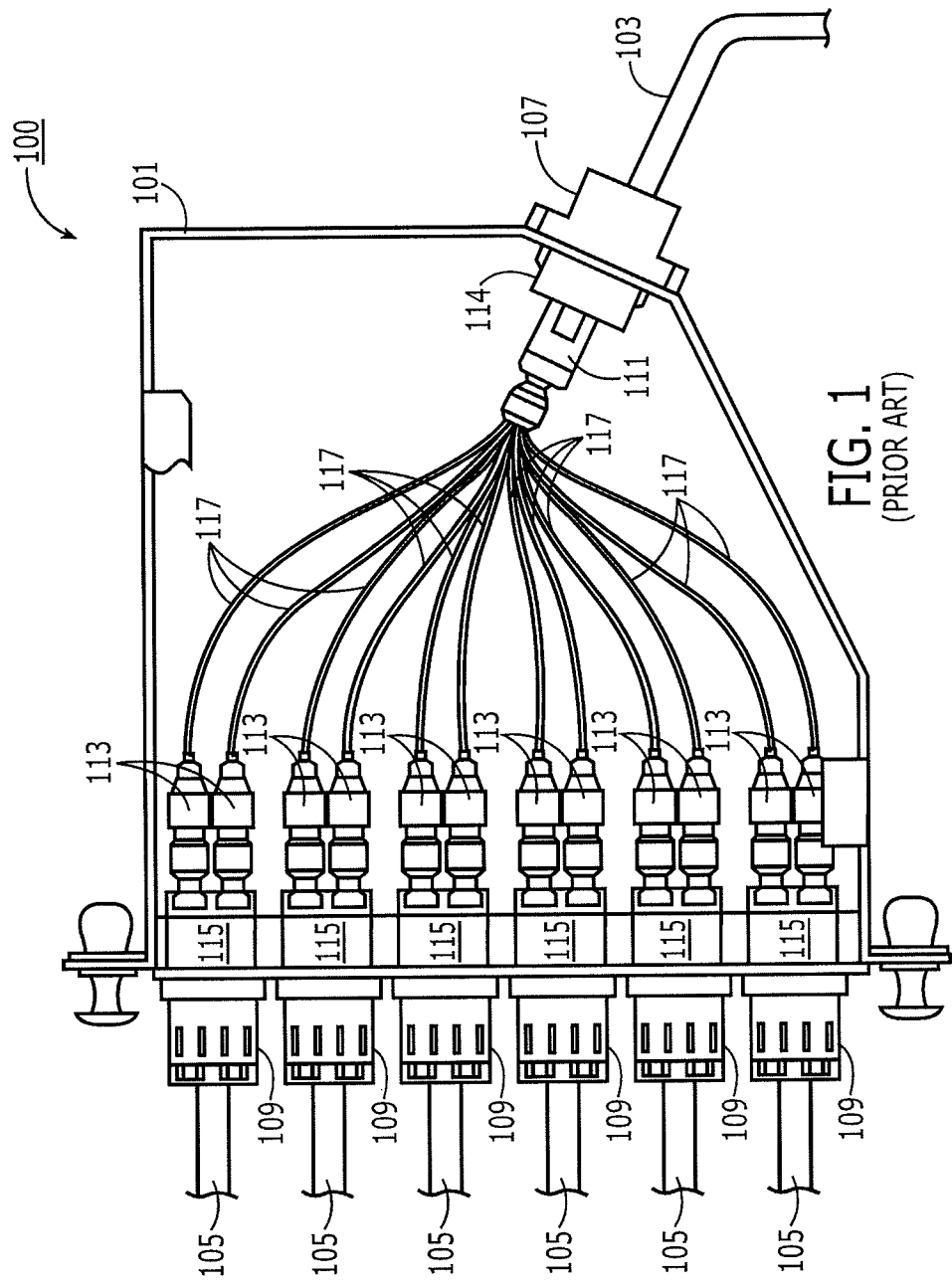
FIG. 1 is a top view of an exemplary fiber optic cassette of the prior art with the top panel removed.

The present invention relates to a method and apparatus for interconnecting first and second optical components, such as optical cables or electro-optical devices in a cost-effective, flexible, and repeatable manner. The invention is particularly suitable in such applications as optical cassettes, patch cables, optical splitters, and patch panel interconnectors, zone distribution hardware, wall fixtures and the like.

The present invention involves the use of flexible optical circuits bearing at least one, but, more effectively, many optical fibers embedded in a flexible optical circuit substrate with a molded lens disposed at at least one end face of the one or more fibers. The lenses can be optically interfaced with external standard optical connectors (e.g., MPO, LC, ST, SC plugs) at the ends of cables or at the interfaces of electro-optical devices without the need for a conventional mating connector (e.g., MPO, LC, ST, SC receptacles). Rather, a connector on an optical component, e.g., an LC plug at the end of a fiber optic cable, can be plugged into an adapter on a panel of an optical cassette to optically couple directly with the lens at the end of the embedded optical fiber, such as an LC receptacle connector, inside of the cassette enclosure. The elimination of conventional connectors inside the cassette significantly reduces the overall costs because it eliminates the highly skilled labor normally associated with terminating an optical fiber to a connector, including, polishing and epoxying the fiber into the connector as well as the labor and craft dependencies associated with routing optical fibers inside a cassette. It further allows the cassette to be made very thin. Further, the flexible optical circuit in accordance with the present invention need not be placed in a rigid housing or any housing at all, depending on the particular application.

Since the lensed flexible optical circuit is mechanically flexible, the concept of the present invention can be used in many different applications, of which an optical cassette is merely one example. For instance, it can be placed in an L-shaped housing and used to make right angle connections, such as a right angle optical wall adapter. It may be wound into a cylinder and used to make interconnections in existing conduit. The lensed flexible optical circuit connectivity concept can be incorporated into flexible housings, such as housings made of rubber so that a single cassette can be used to make connections in different environments and/or can compensate in all six degrees of freedom (e.g., X, Y and Z axes and roll, pitch, and yaw) to compensate for any form of misalignment of two components that are to be optically interconnected. Due to the flexible nature of the flexible optical circuit substrate, the invention can accommodate virtually any physical environment in which the interconnection fibers are not coplanar. As just noted, the flexible optical circuit can be bent into any non-planar shape, including, but not limited to, a cylinder, an S curve, a right angle curve, a compound curve, and corrugations.

The invention further can be incorporated into housings having two parts interconnected by a hinge so that they are bendable about the axis of the hinge to provide similar flexibility.

It is envisioned that a finite number of flexible optical circuits in accordance with the present invention combined with a finite number of modularly connectable housing components, particularly flexible, bendable, stretchable and/or hingedly connectable housing components, and one or more different lens blocks can offer the ability to modularly construct an optical interconnect for virtually any situation from a relatively small number of pieces. Such a modular system would substantially reduce costs and substantially increase quality and repeatability by substantially reducing or eliminating the human labor involved in fabricating such optical interconnection circuits.

Figure 2:
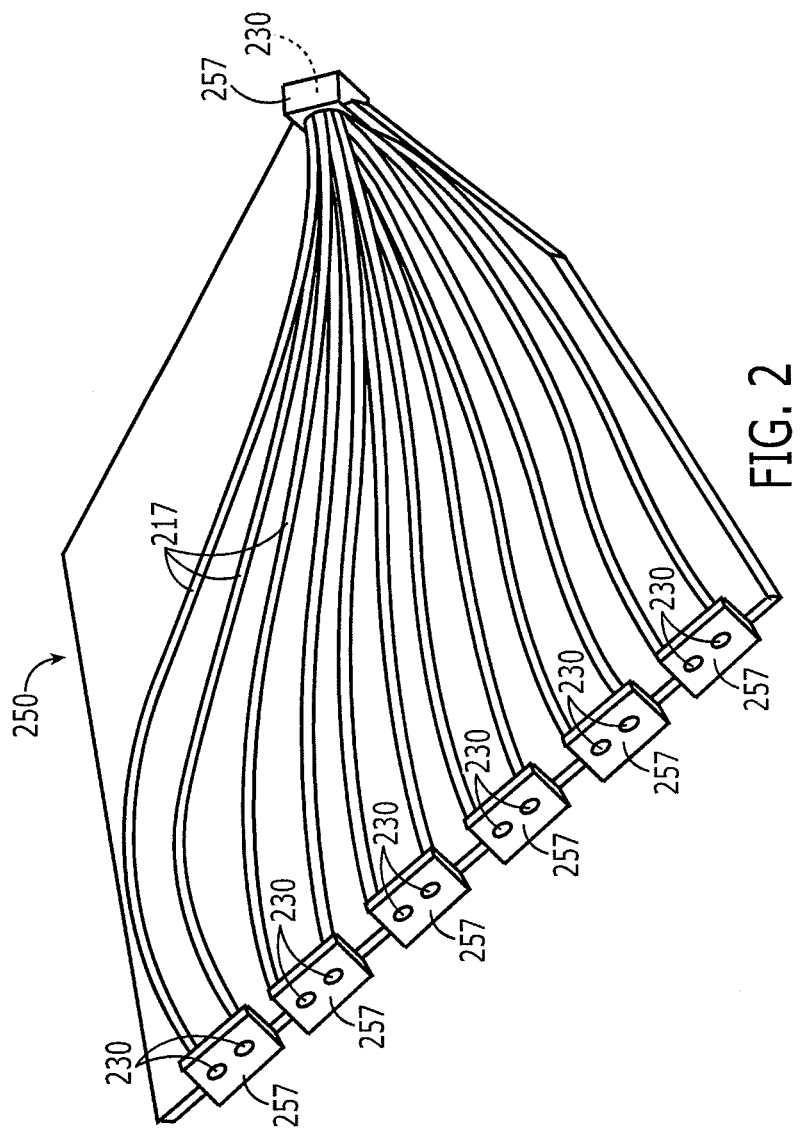
FIG. 2 is a depiction of a flexible fiber optical circuit in accordance with the principles of the present invention.

FIG. 2 shows a flexible optical circuit 250 in accordance with the principles of the present invention. This particular flexible optical circuit achieves the same signal routing as the cassette in FIG. 1. Particularly, an optical fiber cable, such as cable 103 in FIG. 1 on the right side containing twelve fibers that need to be routed, one each to the twelve single optical connectors, such as connectors 113 in FIG. 1 on the left. Thus, the flexible optical circuit 250 includes twelve optical fibers 217 routed accordingly. All of the embedded fibers 217 are terminated at each end with a molded lens 230. The lenses 230 are disposed in a lens block 257, which can be mounted in a separate holder (not shown in FIG. 2) as discussed in more detail below in connection with FIG. 4.

Flexible optical circuits are known, and hence, will not be described in detail. However, they essentially comprise one or more fibers 217 sandwiched between two or more flexible sheets of material 226, 228, such as Mylar™ or another polymer. An adhesive 255 may be included between two sheets in order to make them adhere to each other. Alternately, depending on the sheet material and other factors, the two sheets 226, 228 may be heated above their melting point to heat weld them together with the fibers embedded between the two sheets.

Considerable technology has been developed relating to the design, fabrication, and use of such lenses in optical connectors, which technology can be used to design and fabricate such lenses 230, terminate the optical fibers 217 with such lenses, and couple light through such lenses to fibers in optical connectors. Such information can be obtained from the following patents and patent applications, all of which are incorporated herein fully by reference.

U.S. Pat. No. 7,722,261 entitled Expanded Beam Connector;

U.S. Patent Publication No. 2011/0096404 filed Oct. 28, 2009 entitled Expanded Beam Interface Device and Method of Fabricating Same;

U.S. Patent Publication No. 2009/0097800 filed Oct. 9, 2008 entitled Multi-Fiber Ferrules for Making Physical Contact and Method of Determining Same;

U.S. Pat. No. 6,208,779 entitled Optical Fiber Array Interconnection;

U.S. Pat. No. 6,480,661 entitled Optical ADD/DROP Filter and Method of Making Same;

U.S. Pat. No. 6,690,862 entitled Optical Fiber Circuit;

U.S. Pat. No. 6,012,852 entitled Expanded Beam Fiber Optic Connector; and

U.S. patent application Ser. No. 12/836,067 filed Jul. 14, 2010 entitled Single-Lens, Multi-Fiber Optical Connector Method and Apparatus.

More specifically, technology is available to couple a connector directly in front of the lens 230 so that the lens does not need to have its own conventional mating connector, such as disclosed in aforementioned U.S. Pat. No. 7,722,261. Rather, with reference to FIG. 3, which shows the flexible optical circuit 250 of FIG. 2 incorporated into an optical cassette 200 like that of FIG. 1, cables 103, 105 (or other optical components that are to be optically interconnected) can be terminated with conventional connectors 107, 109, as in FIG. 1. These connectors 107, 109 may be plugged into adapters 115 on the cassette 200 adjacent the respective lenses 230 and optically couple with the lenses (and, through the lenses, with the fibers 217 of the flexible optically circuit) without the need for a conventional second, mating connector on the inside of the cassette housing 201.

With respect to the multiple fiber connector 107, each fiber may optically couple to an individual lens. However, alternately, a single large lens 230 can be used to couple the light from each of the twelve fibers in connector 107 individually into the twelve fibers 217 on the flexible optical circuit 250. For instance, see U.S. patent application Ser. No. 12/836,067.

The use of the lensed flexible optical circuit 250 disclosed herein, therefore, eliminates most, if not all, of the skilled manual labor normally associated with fabricating an optical cassette. Particularly, polish the end faces of the fibers. Furthermore, there is no need to manually route optical fibers inside the cassette housing manually, which can be quite difficult when the number of optical couplings that need to be made is large. Flexible optical circuits, on the other hand, are generally fabricated on substantially automated machines and thus can be mass produced quickly and inexpensively and then just inserted into a housing.

The invention also eliminates many of the components employed in conventional internal connection and simplifies the connector process. This feature further reduces costs significantly as well as allows the housing to be very thin and/or flexible.

Figure 3:
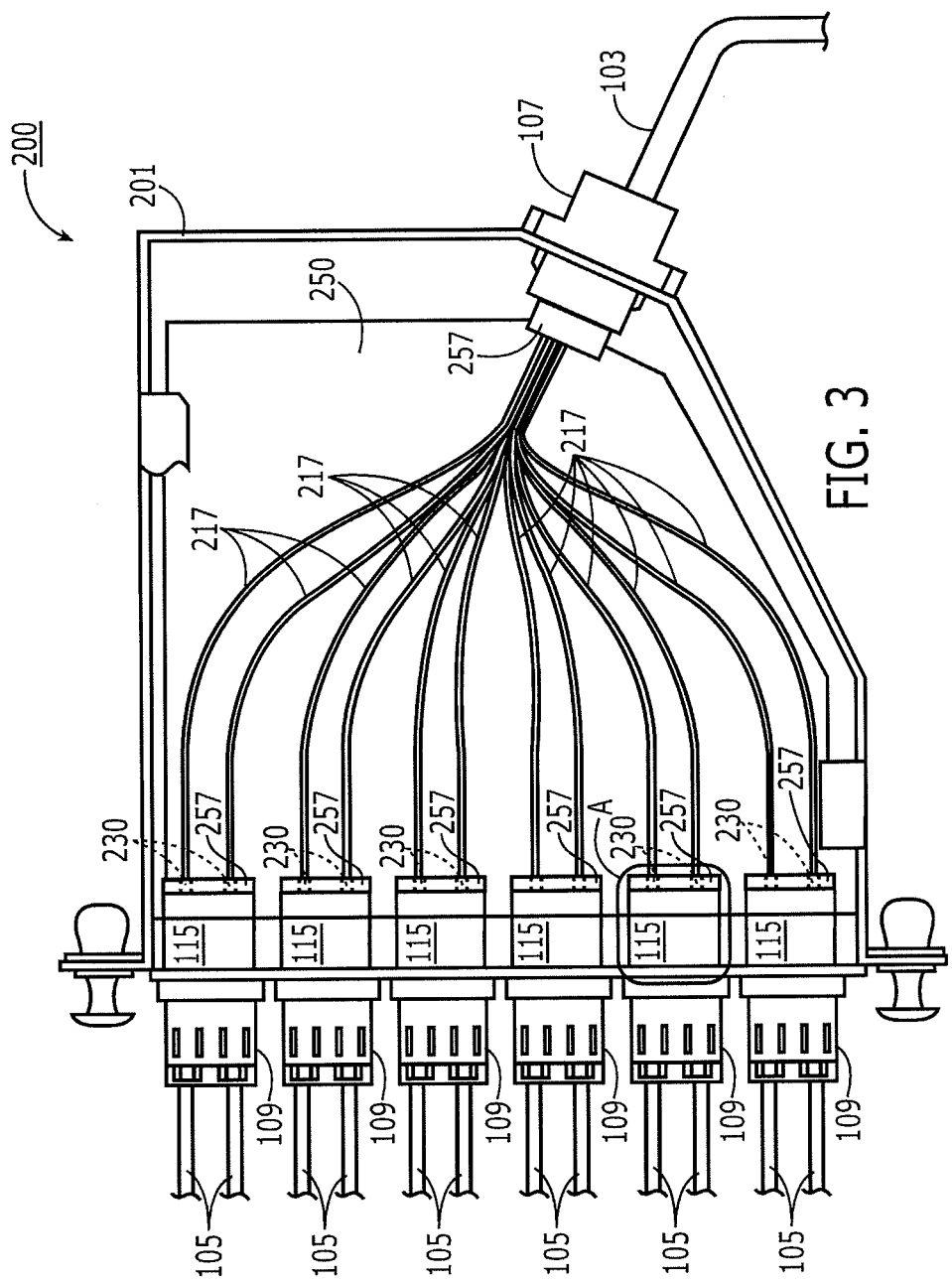
FIG. 3 is a plan view of a fiber optic cassette in accordance with the principles of the present invention with the top panel removed.
Figure 4:
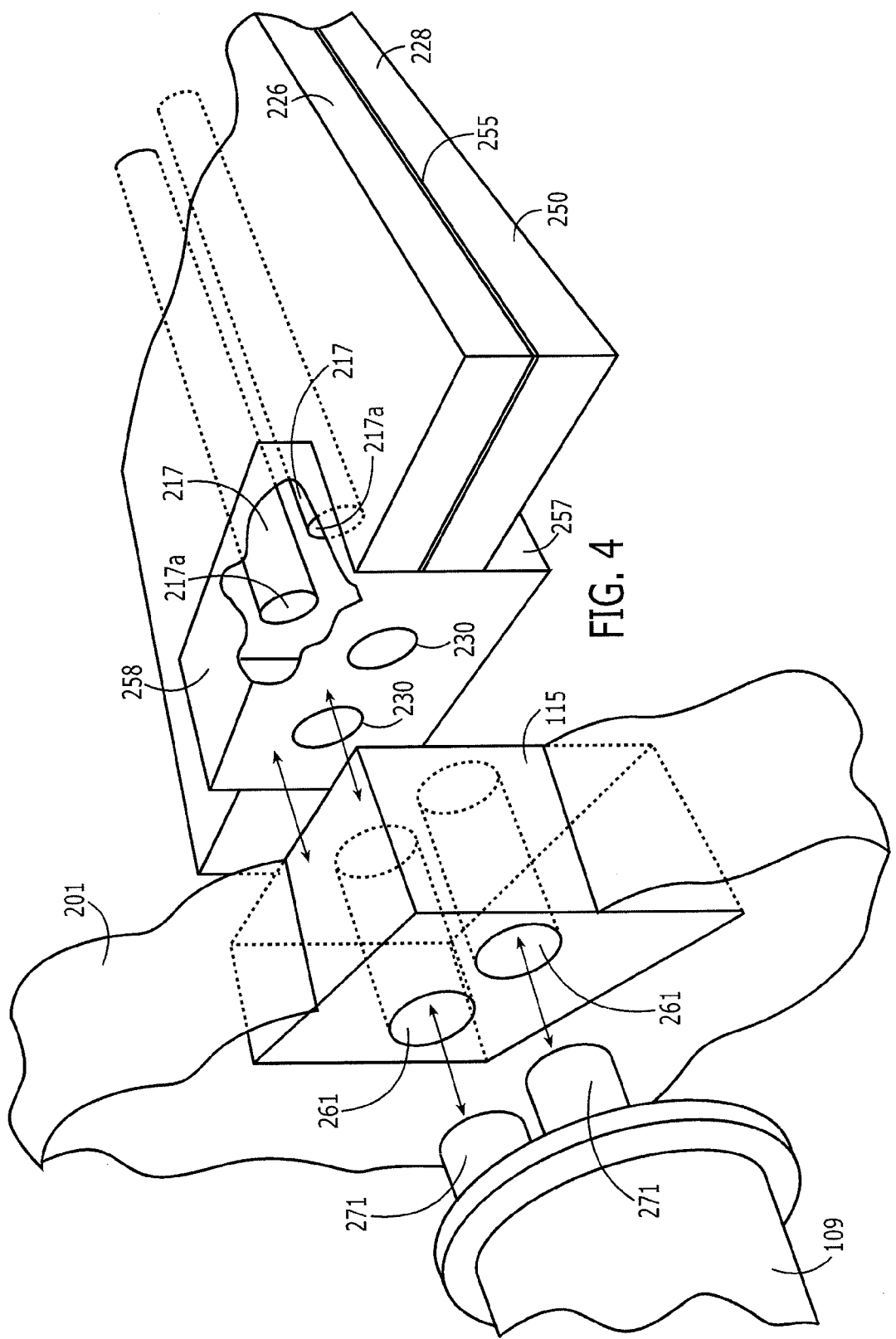
FIG. 4 is a detailed view of portion A of FIG. 3.

FIG. 4 is a detailed exploded view of portion A of FIG. 3 illustrating the interface of two fibers 217 in the flexible optical circuit 250 to two fibers 271 in an exemplary two fiber external connector 109. Particularly, the external connector 109, which may be any conventional connector, such as an SC, LC, ST, or MPO connector, is inserted into an adapter 115 in an aperture in cassette housing 201 essentially in a conventional manner. On the internal side of housing 201, the flexible optical circuit 250 contains fibers 217, the end faces 217a of which are terminated to a lens block 257 comprising two lenses 230 molded as part of a polymer block 258. Alternatively, the lenses can be fabricated separately and placed in openings in a supporting block, such as a polymer block. An index-matching material (not shown), such as a gel or adhesive, may be placed in the interstices between the end faces 217a of the fibers of the flexible optical circuit 250 and the lenses 230 to minimize losses. Anti-reflective elements or coatings also may be interposed to enhance optical return loss characteristics. The other sides of the lenses 230 are abutted to the adapter aligned with the light paths 261 defined by the adapter, which, in turn, are aligned with the end faces of the optical fibers 271 in the external connectors 109. Again, an index matching material and/or may be placed between the lenses 230 and the adapters 115 and/or connectors 109

The aforedescribed cassette embodiment is merely one embodiment of the present invention. In other embodiments, there may be no housing or the housing may be flexible. For instance, connectors may be incorporated into the flexible optical circuits in other embodiments. Specifically, the lenses may be incorporated into conventional connectors mounted on the flexible optical circuit which can then be mated to the opposing complementary connectors.

Figure 5:
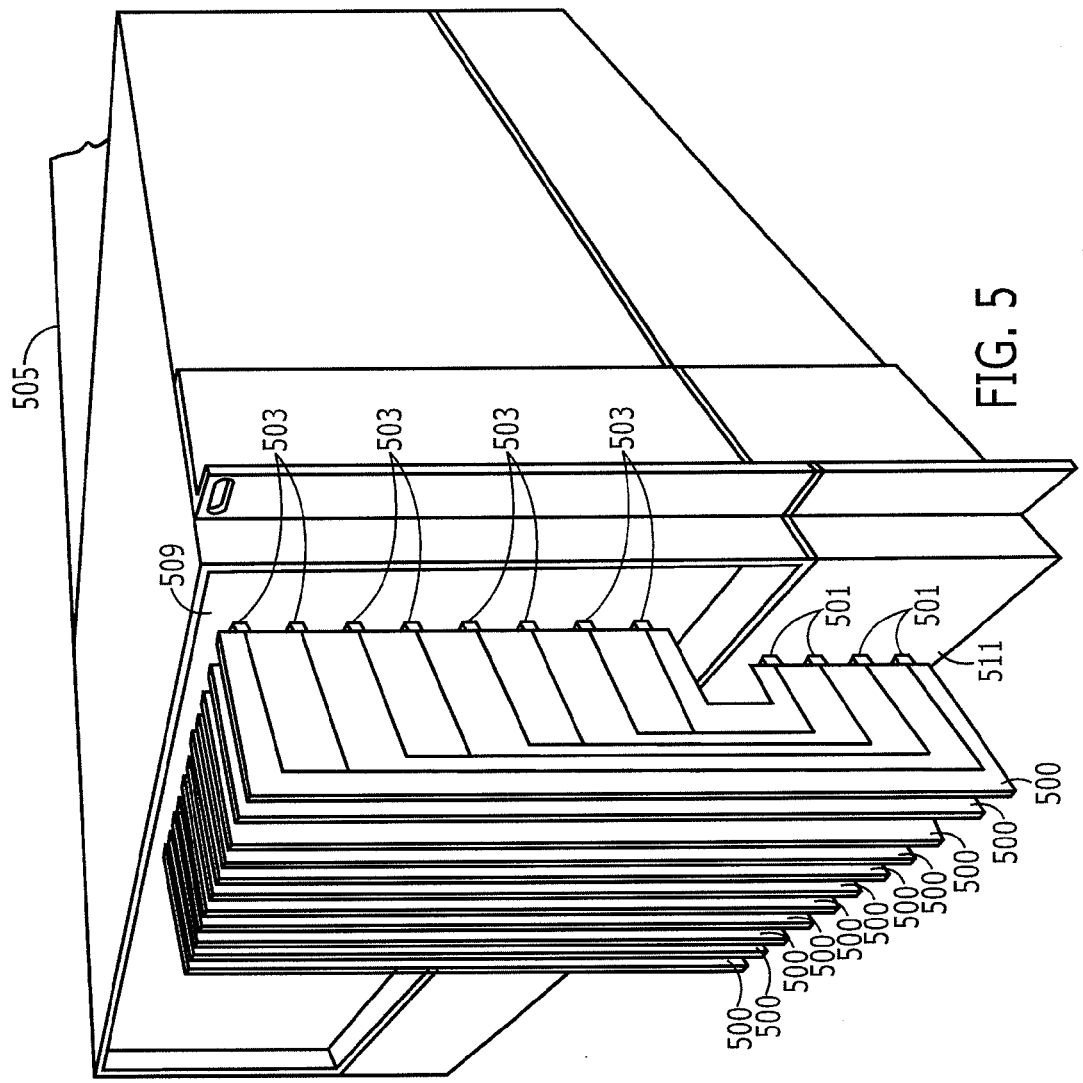
FIG. 5 is a diagram illustrating an embodiment of the invention used for making optical connecting between patch panels in an equipment rack.

FIG. 5, for instance, illustrates an optical interconnect 500 in accordance with the principles of the present invention being used to break out optical signals from a set of four multi-fiber connectors 501 (each connector, in turn, comprising four fibers) to sixteen single fiber connectors 503 in an equipment rack 505. Particularly, FIG. 5 shows a portion of an equipment rack 505 containing a top row of vertically oriented patch panels 509 and a bottom row of vertically aligned patch panels 511. The top row of patch panels 509 comprises a plurality of vertically-oriented, dual-fiber connectors. The bottom row of patch panels comprises a plurality of four slot, vertically-oriented patch panels 511, each slot containing a connector having 4 fibers.

For each column, the breakouts from the bottom row of multi-fiber connectors to the top row of single fiber connectors 503 are accomplished by a series of flexible optical circuits 500 terminated with suitable connectors in accordance with the present invention. For this application, the opposing end faces of the fibers on flexible optical circuits 500 face in the same direction and are disposed adjacent the same edge of the flexible optical circuit or at least substantially collinear edges of the flexible optical circuit.

In the prior art, these connections conventionally would be made with the plurality of custom-made 1 to 4 cable assemblies with suitable connectors at each end. Accordingly, making the interconnections in just one column would require a person to plug in 16 (12+4) different connectors in what is likely to be a very tight space because, presumably, there are already other cables and connectors all around the connections that need to be made. In addition, the rack very likely may be in a data center comprising scores or hundreds of such racks closely packed, making for a very cramped working environment.

Using the flexible optical circuit interconnector 500 of the present invention, those sixteen connections can be made simultaneously by properly aligning the flexible optical circuit interconnector 500 of the present invention with the connectors on the appropriate patch panels 509, 511 and pushing it in all at once to engage all sixteen connectors simultaneously.

For this type of application, the flexible optical circuits can be made rigid enough to allow such pushing without crumpling of the flexible optical circuit, yet flexible enough to flex or stretch to account for any misalignment between the two patch panels 509, 511 involved in the connection.

In other embodiments, a jig may be provided for supporting the flexible optical circuit 500 while it is being pushed in. Such a jig can be as simple as two parallel plates of plexiglass spaced apart from each other enough to slip the flexible optical circuit 500 between the two plates, with the front end (the end including the connectors) sticking out slightly so that they can engage the mating connectors or adapters in the path panels 509, 511 while the majority of the flexible optical circuit is supported by the plates to prevent it from bending, folding or mutilating.

Figure 6:
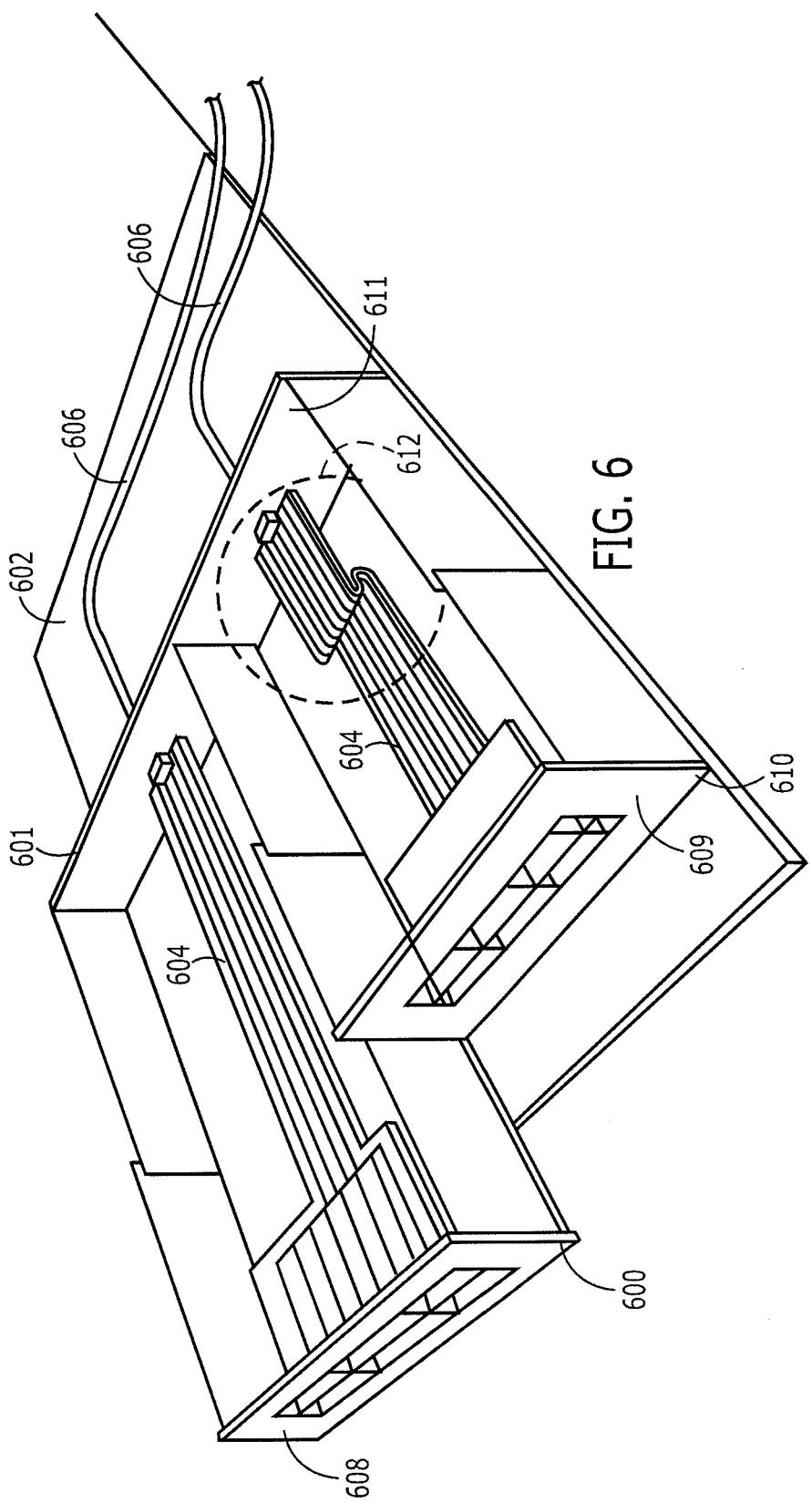
FIG. 6 is a diagram illustrating the principles of the present invention incorporated into a variable depth rack mount enclosure.

FIG. 6 illustrates another use for the present invention in a rack drawer. In the prior art, when optical cables are terminated to rack drawers that can slide in and out of the rack telescopically, excess cable had to be provided hanging out of the back of the rack or entangled with adjacent cables of hardware so that there would be enough excess cable to allow the drawer to be pulled out without tensioning the cables.

In accordance with the present invention, the slack needed to allow the drawers 600, 610 to slide in and out of the rack 602 can be provided within the drawer itself by using a flexible optical circuit 604 of the present invention within the drawer 600, 610 to interconnect the cables 606 at the back panels 601, 611 of the drawers 600, 610 with the patch panels 608, 609 at the fronts of the drawers. The flexible optical circuit 604 is made long enough to accommodate the drawers being pulled all the way out to its front stops, as shown with the upper left drawer 600 in FIG. 6, but can fold up on itself to allow the drawer to be pushed all the way to its rear stops, as shown with the lower, right hand drawer 610 (note: fold 612).

Figure 7:
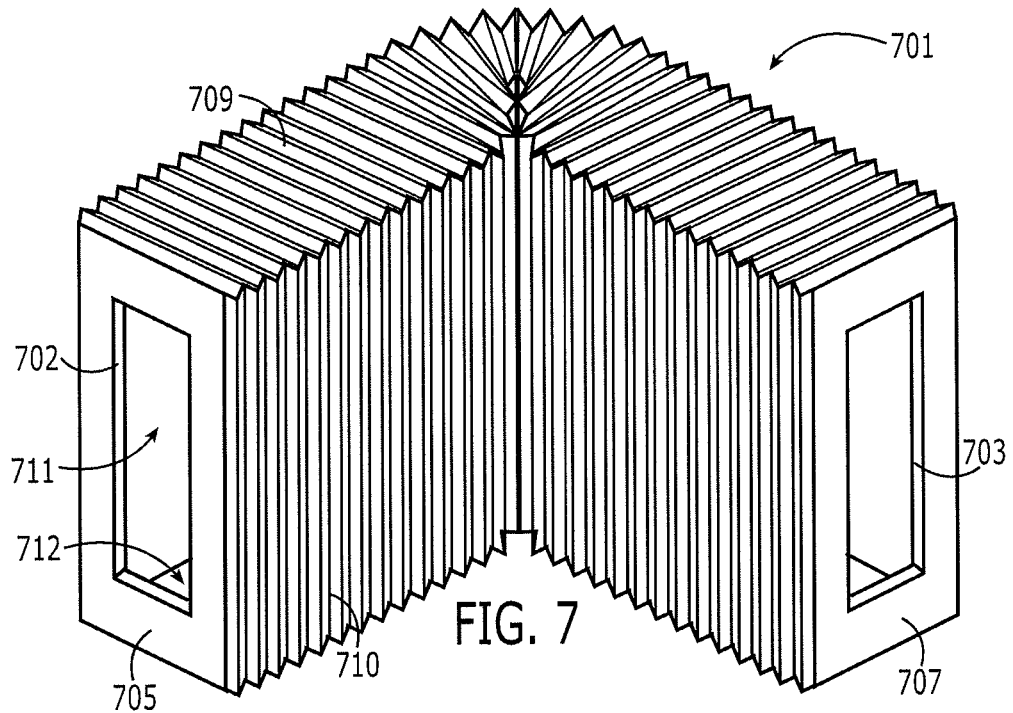
FIG. 7 is a depiction of a variable depth cassette in accordance with one embodiment of the invention.

In yet other embodiments, the flexible optical circuit and/or the housing that it is embodied within may be corrugated in the manner of an accordion so that the flexible optical circuit and its housing can be stretched and compressed longitudinally as well as bent into a compound curve. FIG. 7 illustrates a housing 701 constructed in accordance with such an embodiment. In such an embodiment, for instance, the front and back panels 705, 707 of the housing 701 bearing windows 702, 703 for receiving adapters (also not shown) that will accept the connectors (not shown) of the optical components that will be optically connected through the housing 701 may be made rigid, whereas the side walls 709, 710, 711, 712 are made of a flexible material that can be folded and compressed and stressed in the manner of an accordion, as illustrated. Alternately, the side walls may be telescopically expandable and contractable.

The flexible optical circuit that will go onside the housing 701 may be corrugated in a similar manner to that described above in connection with the housing 701 to make it extendible in length as well as bendable. However, alternately, the flexible optical circuit may be formed into an S shape along its length (as shown in FIG. 6—see 612) so that the linear distance between its longitudinal ends depths of the folds can increase and decrease to accommodate the changing linear distance between the opposite ends 705, 707 of the housing (and consequently the linear distance between the opposing ends of the fibers) similarly to what is illustrated in FIG. 6. Care must be taken so as not to bend the optical fibers too sharply in the corrugations or S curves such that they might break or at least allow light to escape from the cores. However, many manufacturers now offer fibers that can be bent to very small radii curves without breakage or significant signal loss.

Figure 8:
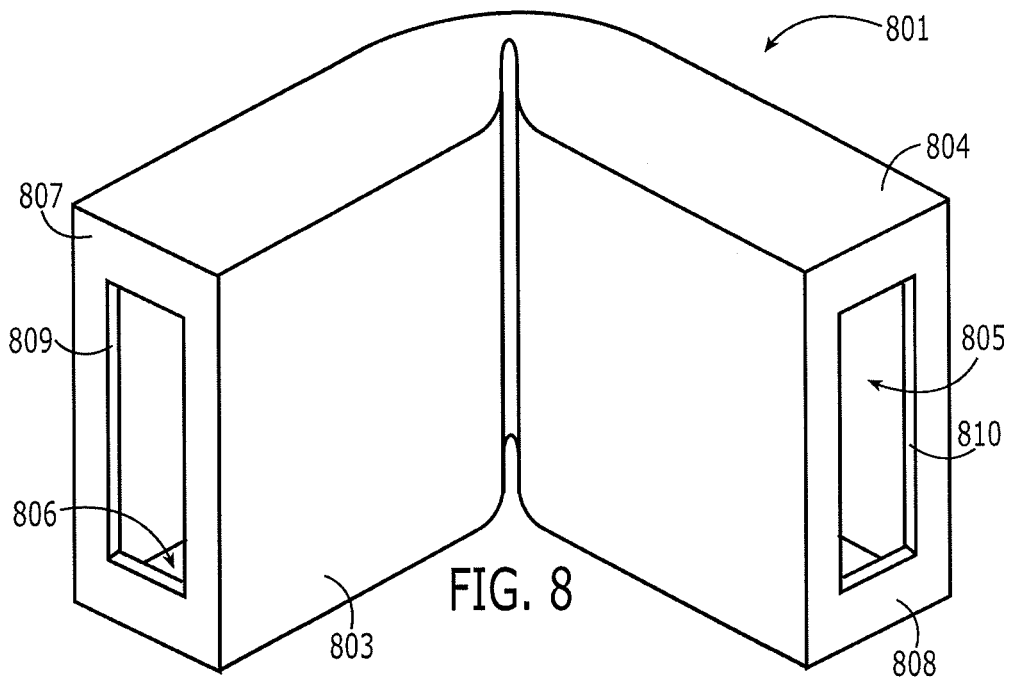
FIG. 8 is a depiction of another cassette in accordance with the principles of the present invention that is flexible.

In yet other embodiments, such as illustrated in FIG. 8, the entire housing 801 or at least the side walls 803, 804, 805, 806 (the walls interconnecting the panels 807, 808 that bear the apertures 809, 810 for receiving the external connectors and/or adapters) may be made of a flexible material such as rubber so that the housing 801 can be bent to accommodate situations in which the optical components to be interconnected by the device cannot be longitudinally aligned.

Figure 9:
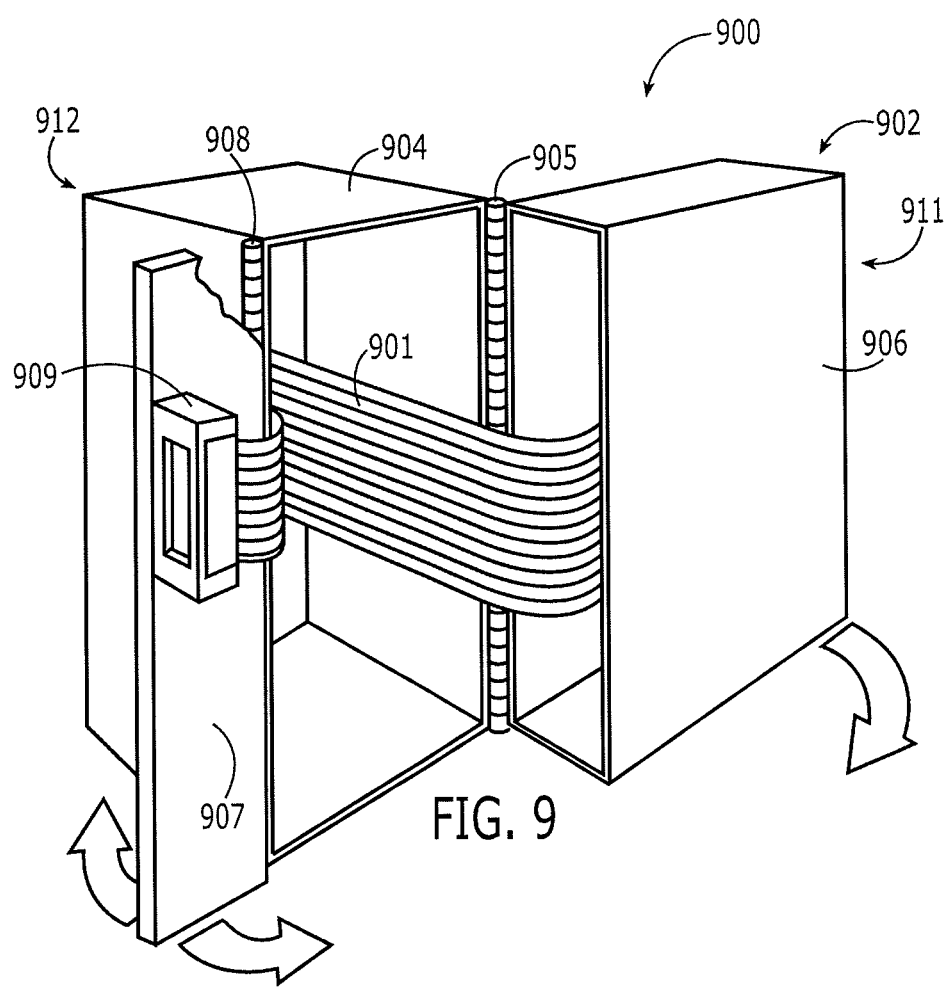
FIG. 9 is a depiction of yet another cassette in accordance with the principles of the present invention that is bendable about a hinge.

FIG. 9 illustrates yet a further embodiment of a device 900 in which the flexible optical circuit 901 is incorporated into a housing 902 that comprises hinged members 904, 906. Specifically, housing 902 comprises two housing pieces 904, 906 joined at a hinge 905 so that the two housing pieces 904, 906 may be disposed relative to each other at different angular orientations about the hinge 905. While housing 902 is shown having an open configuration, it alternately could be closed, such as by adding a third, curved housing member (not shown) inside of the other two members 904, 906 that encloses the internal space of the device 900 and that pieces 904, 906 can slide over as they pivot about hinge 905 relative to each other.

The two lens blocks (not seen) may be disposed on the opposing end faces 911, 912 of the housing 902. However, the illustrated embodiment shows a more adaptable configuration that further includes an additional panel 907 connected to housing piece 904 via a second hinge 908. The lens block 909 is mounted on the panel 907, which can be pivoted about hinge 908 to provide additional freedom in positioning the ends of the flexible optical circuit relative to each other.

Situations in which the present invention is useful are bountiful. For instance, because there are no internal connectors, the flexible optical circuit interconnector of the present invention can be made very thin. Particularly, it may comprise a housing that, other than the end faces that receive the external connectors, merely need be thick enough to house the flexible optical circuit (and accommodate any necessary curvature thereof, such as corrugations or an S curve as mentioned previously). In fact, also as previously noted, in some embodiments, there may be no housing at all and adapters or other structure for receiving the external connectors may be incorporated directly on the flexible optical circuit adjacent the end faces of the fibers and the lenses. Accordingly, it can be used for very low profile surface-mounted boxes for use in wall-mounted interconnects in office buildings, etc. It also can be used for interconnects in modular furniture pieces, which often provide very small spaces for electrical or optical equipment.

Yet further, it is envisioned that a wide variety of optical interconnects can be made modularly from a relatively small number of parts. Particularly, there would need to be a flexible optical circuit for each different optical routing pattern type (e.g., 1 to 12 cable breakout (such as illustrated in FIG. 2), 1 to 4 breakout, 1 to 4 optical splitter, etc.) However, note that a single lensed flexible optical circuit could be used for various different numbers of such breakouts. For instance, a lensed flexible optical circuit in accordance with the present invention that provides fiber routing for ten 1 to 4 breakouts may be used in an optical cassette to provide anywhere from one 1 to 4 breakout to ten 1 to 4 breakouts. If the cassette needs to offer less than ten such breakouts, then some of the fibers/lenses simply are not used.

Since the lensed flexible optical circuits are flexible, they can be bent to accommodate many different physical layouts. The lensed flexible optical circuits may be constructed of a sufficient length to accommodate the most of the longest practical applications since, they can imply be folded up for the shorter applications. In cassette type applications or other application involving a housing, a modular set of multiple housing pieces adapted to be modularly joined to each other in various combinations may be provided. The housing components may provide for hinged and/or fixed joining. One or more of the housing components may be flexible. Thus, it is possible to create almost any housing shape and place one of the lensed flexible optical circuits within it. The housing components may include apertured walls adapted to accept adapters and/or connectors of any form factor.

While the invention has been described herein in connection embodiments employing molded lenses, it will be understood that this is merely exemplary and that other optical components capable of guiding light may be disposed at the ends of the fibers in the flexible optical circuits (or embedded in the laminate at the ends of the fibers) such light-guiding, fiber terminating optical components include, but are not limited to, diffraction gratings, Escalier gratings, mirrors, and holograms.

Figure 10:
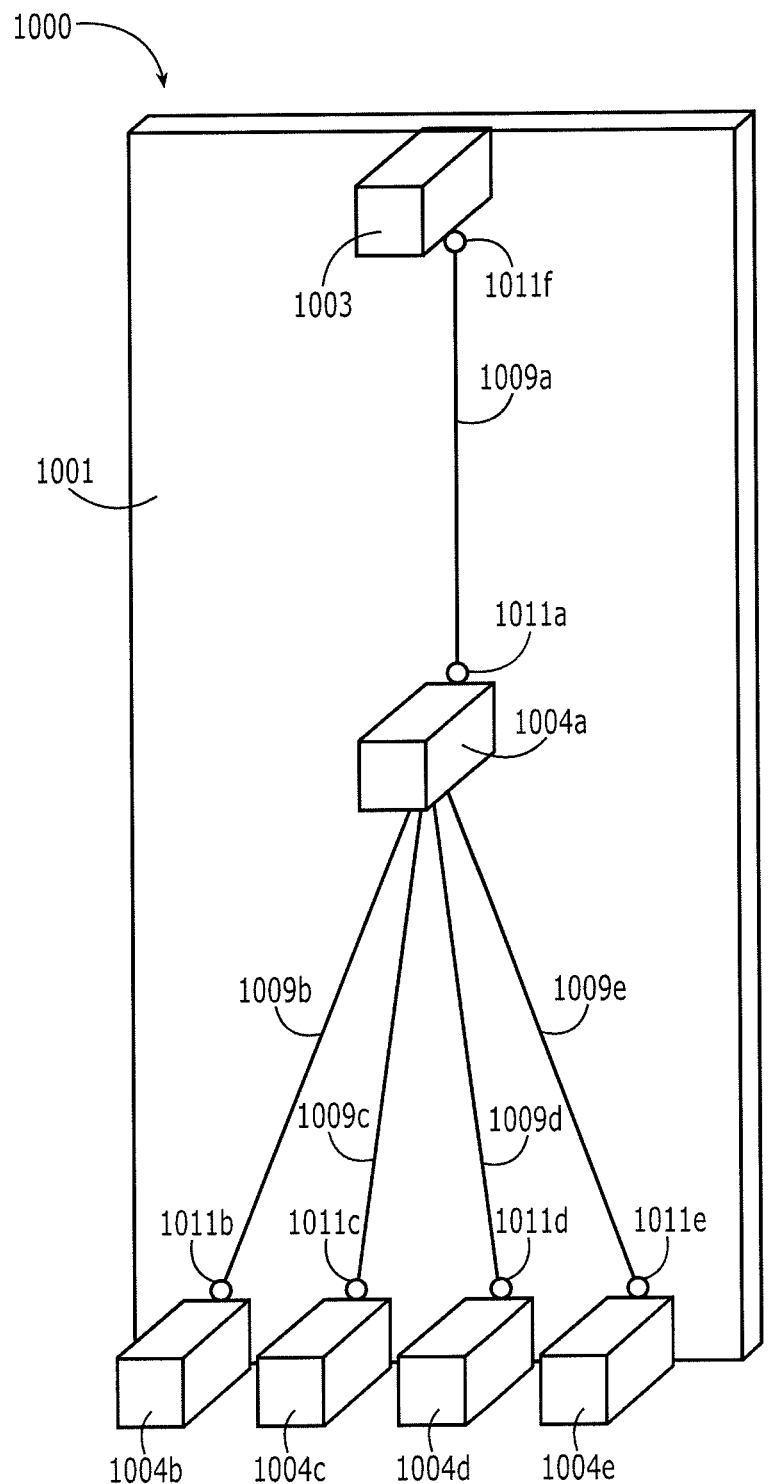
FIG. 10 is a depiction of an optical splitter in accordance with the principles of the present invention.

It further should be understood that not all of the connections need to be made at the opposing ends of the laminate strip. For instance, FIG. 10 illustrates a flexible optical circuit 1001 in accordance with the present invention implemented as an optical splitter 1000. Such a splitter may be incorporated into a passive optical network (PON), for instance. The lensed flexible optical circuit has an input connector 1003 at one longitudinal edge of the flexible optical circuit 1001 and five output connectors 1004a-1004e. Appropriate optical fibers 1009a-1009e and lenses 1011a-1011f are disposed on the circuit 1001 in accordance with the principles of the present invention as previously described to distribute the input signal from received through input connector 1003 to the five output connectors 1004a-1004e. Four of those output connectors 1004b-1004e are located at the opposing longitudinal edge of the flexible optical circuit, but one of the output connectors 1004a is disposed in the middle of the flexible optical circuit 1001. In this particular exemplary embodiment, the lens 1011a adjacent the middle output connector 1004a is configured to operate as a splitter. For instance, it may be an expanded beam lens that increases the diameter of the beam received on input fiber 1009*a* and couples it into the four output fibers 1009*b*-1009*e* as well as directly into middle connector 1004*a*. Additional lenses may be disposed in front of the output fibers 1009*b*-1009*e* in order to focus the beams back into the output fibers. This intermediate point can be employed, for instance, for monitoring signals or optical power in the circuit without interrupting transmission in that device.

Yet further, the principles of the present invention can be used to replace patch panels in equipment racks in data centers. Optical interconnections can be made in such a small, thin space using the present invention that such optical interconnects may be disposed in unoccupied air space within equipment racks that are otherwise fully occupied so as to provide even more dense optical interconnections in existing equipment racks.

In yet other embodiments, electrically conductive wires also may be embedded within the flexible optical circuit along with the optical fibers in order to provide both electrical and optical connectivity in one device. Applications with a need for combined optical and electrical connectivity abound, such as power over Ethernet applications and out of band signaling applications, such as disclosed in U.S. Pat. No. 7,433,915.

Having thus described particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An optical cassette comprising:
a cassette housing defining an interior and an exterior;
a first optical connector selected from the group consisting of an SC connector, an LC connector, an ST connector, and an MPO connector coupled to the cassette housing, the first optical connector terminating a cable carrying a plurality of optical fibers that extend into the interior of the cassette housing;
a flexible optical circuit defined by a flexible substrate positioned within the interior of the cassette housing, the flexible substrate physically supporting the plurality of optical fibers extending into the interior of the cassette housing from the first optical connector to a plurality of optical adapters located on the cassette housing, wherein each optical adapter defines a first side and an opposite second side, wherein the first side is configured to receive a second optical connector selected from the group consisting of an SC connector, an LC connector, an ST connector, and an MPO connector coming from the exterior of the cassette housing and the second side is configured to receive a third light-guiding, fiber termination optical element that is not any of an SC connector, an LC connector, an ST connector, or an MPO connector from the interior of the cassette housing for mating with the second optical connector, the third light-guiding, fiber termination optical element having a different format than the second optical connector, wherein each third light-guiding, fiber termination optical element terminates one of the fibers supported by the flexible substrate.

2. An optical cassette according to claim 1, wherein the cassette housing defines a front side and a rear side, the first optical connector positioned at the rear side and the plurality of optical adapters positioned at the front side with the flexible substrate positioned therebetween.

3. An optical cassette according to claim 2, wherein the flexible substrate is configured to allow bending in a direction generally perpendicular to a direction extending from the front side to the rear side of the cassette housing.

4. An optical cassette according to claim 1, wherein each second optical connector includes an optical ferrule and each third light-guiding, fiber termination optical element is selected from the group consisting of a lens, a diffraction grating, an Escalier grating, a mirror, and a hologram.

5. An optical cassette according to claim 1, wherein the first optical connector is an MPO connector.

6. An optical cassette according to claim 1, wherein the plurality of optical fibers includes at least twelve optical fibers.

7. An optical cassette according to claim 1, wherein end faces of each of the optical fibers extending from the first optical connector and supported by the flexible substrate are terminated into a polymer block adjacent the plurality of optical adapters.

8. An optical cassette according to claim 1, wherein the third light-guiding, fiber termination optical elements are physically mounted on the flexible substrate.

* * * * *